United States Patent [19]

Matyas et al.

[11] Patent Number: 5,007,089

[45] Date of Patent: Apr. 9, 1991

[54] SECURE KEY MANAGEMENT USING PROGRAMABLE CONTROL VECTOR CHECKING

[75] Inventors: Stephen M. Matyas; Donald B. Johnson; An V. Le, all of Manassas, Va.; William C. Martin, Concord, N.C.; Rostislaw Prymak, Dumfries; John D. Wilkins, Somerville, both of Va.

[73] Assignee: International Business Machines Corporation, Armonk, N.Y.

[21] Appl. No.: 506,319

[22] Filed: Apr. 9, 1990

[51] Int. Cl.[5] .............................................. H04K 1/00
[52] U.S. Cl. ........................................ 380/49; 380/25
[58] Field of Search ............................. 380/21, 23-25, 380/49

[56] References Cited

U.S. PATENT DOCUMENTS

| | | | |
|---|---|---|---|
| 4,218,738 | 8/1980 | Matyas et al. | 380/25 |
| 4,223,403 | 9/1980 | Konheim et al. | 380/24 |
| 4,227,253 | 10/1980 | Ehrsam et al. | 380/25 |
| 4,386,233 | 5/1983 | Smid et al. | 380/25 |
| 4,500,750 | 2/1985 | Elander et al. | 380/21 |
| 4,503,287 | 3/1985 | Morris et al. | 380/41 |
| 4,578,530 | 3/1986 | Zeidler | 380/24 |
| 4,620,276 | 10/1986 | Daniell et al. | 364/200 |
| 4,683,968 | 8/1987 | Appelbaum et al. | 380/25 |
| 4,723,283 | 2/1988 | Nagasawa et al. | 380/24 |
| 4,723,284 | 2/1988 | Munck et al. | 380/25 |
| 4,850,017 | 7/1989 | Matyas et al. | 380/21 |
| 4,908,861 | 3/1990 | Matyas et al. | 380/25 |
| 4,918,728 | 4/1990 | Matyas et al. | 380/21 |
| 4,924,514 | 5/1990 | Matyas et al. | 380/24 |
| 4,924,515 | 5/1990 | Matyas et al. | 380/25 |
| 4,941,176 | 7/1990 | Matyas et al. | 380/21 |

OTHER PUBLICATIONS

R. W. Jones, "Some Techniques for Handling Encipherment Keys," ICL Technical Journal, Nov. 1982, pp. 175-188.

D. W. Davies & W. L. Price, "Security for Computer Networks," John Wiley & Sons, NY, 1984, Section 6.5, Key Management with Tagged Keys, pp. 168-172.

*Primary Examiner*—Salvatore Cangialosi
*Attorney, Agent, or Firm*—John E. Hoel

[57] ABSTRACT

The invention includes a control vector checking code respository located either within the same system as the crytographic facility or alternately remotely from the system containing the cryptographic facility. The control vector checking code repository will be linked to the cryptographic facility by one of several means. A first means for linking the repository to the cryptographic facility would include a physically secure data communications link. A second means for connecting the repository to the cryptographic facility would be by using an insecure channel with authentication, wherein either a modification detection code or alternately a message authentication code would be transmitted to the cryptographic facility and then the desired control vector checking code would be transmitted over the link. The cryptographic facility will include a code authorization mechanism to compare the transmitted MAC or MDC with a corresponding value computed from the received control vector checking code. If the two values of the MDC or the MAC compare, then the control vector checking code is authenticated and loaded into the control vector checking unit for carrying out the control vector checking operations desired. The control vector checking code repository can be located in a remote system connected by means of the communications link to the crypto facility, or alternately the repository can reside in the same system as the crypto facility. This provides for the dynamic updating of control vector checking code, where improvements or alterations are made to the control vector checking sequence. This also provides for a reduced memory size in the crypto facility, being sufficiently large to accommodate subsidiary control vector checking applications, with alternate control vector checking applications requiring the reloading of the control vector checking unit from the repository.

16 Claims, 9 Drawing Sheets

SECURE KEY MANAGEMENT USING PROGRAMABLE CONTROL VECTOR CHECKING

BACKGROUND OF THE INVENTION

1. Technical Field

The invention disclosed broadly relates to data processing systems and methods and more particularly relates to cryptographic systems and methods for use in data processing systems to enhance security.

2. Related Patent Applications

The following co-pending patent applications are related to this invention and are incorporated herein by reference.

B. Brachtl, et al., "Controlled Use of Cryptographic Keys Via Generating Stations Established Control Values," Ser. No. 55,502, filed March 1987, and assigned to the IBM Corporation, now U.S. Pat. No. 4,805,017.

S. M. Matyas, et al., "Data Authentication Using Modification Detection Codes Based on Public One Way Encryption Function," Ser. No. 90,633, filed Aug. 28, 1987, assigned to the IBM Corporation, now U.S. Pat. No. 4,908,861.

S. M. Matyas, et al., "Secure Management of Keys Using Control Vectors," Ser. No. 231,114, filed Aug. 11, 1988, assigned to the IBM Corporation, Now U.S. Pat. No. 4,941,176.

S. M. Matyas, et al., "Data Cryptography Operations Using Control Vectors," Ser. No. 401,486, filed Aug. 30, 1989, assigned to the IBM Corporation, now U.S. Pat. No. 4,918,728.

S. M. Matyas, et al., "Personal Identification Number Processing Using Control Vectors," Ser. No. 398,300, filed Aug. 24, 1989, assigned to the IBM Corporation, now U.S. Pat. No. 4,924,514.

S. M. Matyas, et al., "Secure Management of Keys Using Extended Control Logic," Ser. No. 398,299, filed Aug. 24, 1989, assigned to the IBM Corporation, now U.S. Pat. No. 4,924,515.

S. M. Matyas, et al., "Secure Management of Keys Using Control Vectors With Multi-Path Checking," Ser. No. 344,165, filed Apr. 27, 1989.

3. Background Art

The above referenced co-pending patent applications, which are incorporated herein by reference, describe a cryptographic architecture for validating that key management functions requested for a cryptographic key in a data processing system, have been authorized by the originator of the key. The above referenced co-pending patent applications describe a control vector checking unit within a cryptographic facility, which contains the entire repertoire of control vector checking code for the intended applications of the system. However, one can envision applications wherein the sequence of control vector checking steps might be modified, for example where security improvements are desired for a particular protected application. Other circumstances where one might envision the need for changing the control vector checking code within the control vector checking unit would include a crypto facility having a control vector checking unit with a relatively small storage capacity for control vector checking code. In that circumstance, where subsidiary applications are mutually exclusive, such as a banking application where a checking transaction is mutually exclusive of a loan application, a central repository such as the bank's CPU, could transmit to the control vector checking unit, only that amount of control vector checking code necessary to perform the particular subsidiary application. When a different subsidiary application is desired to be executed, the control vector checking unit would be programmed with a different control vector checking code sequence by the bank's CPU.

OBJECTS OF THE INVENTION

It is therefore an object of the invention to provide a secure method for key management in which the control vector checking code can be changed in the control vector checking unit.

It is another object of the invention to provide a secure method for key management in which control vector checking code can be transmitted to the control vector checking unit for a particular application.

It is still a further object of the invention to provide a secure method for key management in which control vector checking code can be input to the control vector checking unit, which includes modifications to the control vector checking operation.

SUMMARY OF THE INVENTION

These and other objects, features and advantages are accomplished by the secure key management invention using programmable control vector checking. The invention includes a control vector checking code repository located either within the same system as the cryptographic facility or alternately remotely from the system containing the cryptographic facility. The control vector checking code repository will be linked to the cryptographic facility by one of several means. A first means for linking the repository to the cryptographic facility would include a physically secure data communications link. A second means for connecting the repository to the cryptographic facility would be by using an insecure channel with authentication, wherein either a modification detection code or alternately a message authentication code would be transmitted to the cryptographic facility and then the desired control vector checking code would be transmitted over the link. The cryptographic facility will include a code authorization mechanism to compare the transmitted MAC or MDC with a corresponding value computed from the received control vector checking code. If the two values of the MDC or the MAC compare, then the control vector checking code is authenticated and loaded into the control vector checking unit for carrying out the control vector checking operations desired. The control vector checking code repository can be located in a remote system connected by means of the communications link to the crypto facility, or alternately the repository can reside in the same system as the crypto facility. This provides for the dynamic updating of control vector checking code, where improvements or alterations are made to the control vector checking sequence. This also provides for a reduced memory size in the crypto facility, being sufficiently large to accommodate subsidiary control vector checking applications, with alternate control vector checking applications requiring the reloading of the control vector checking unit from the repository.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Figure 1:
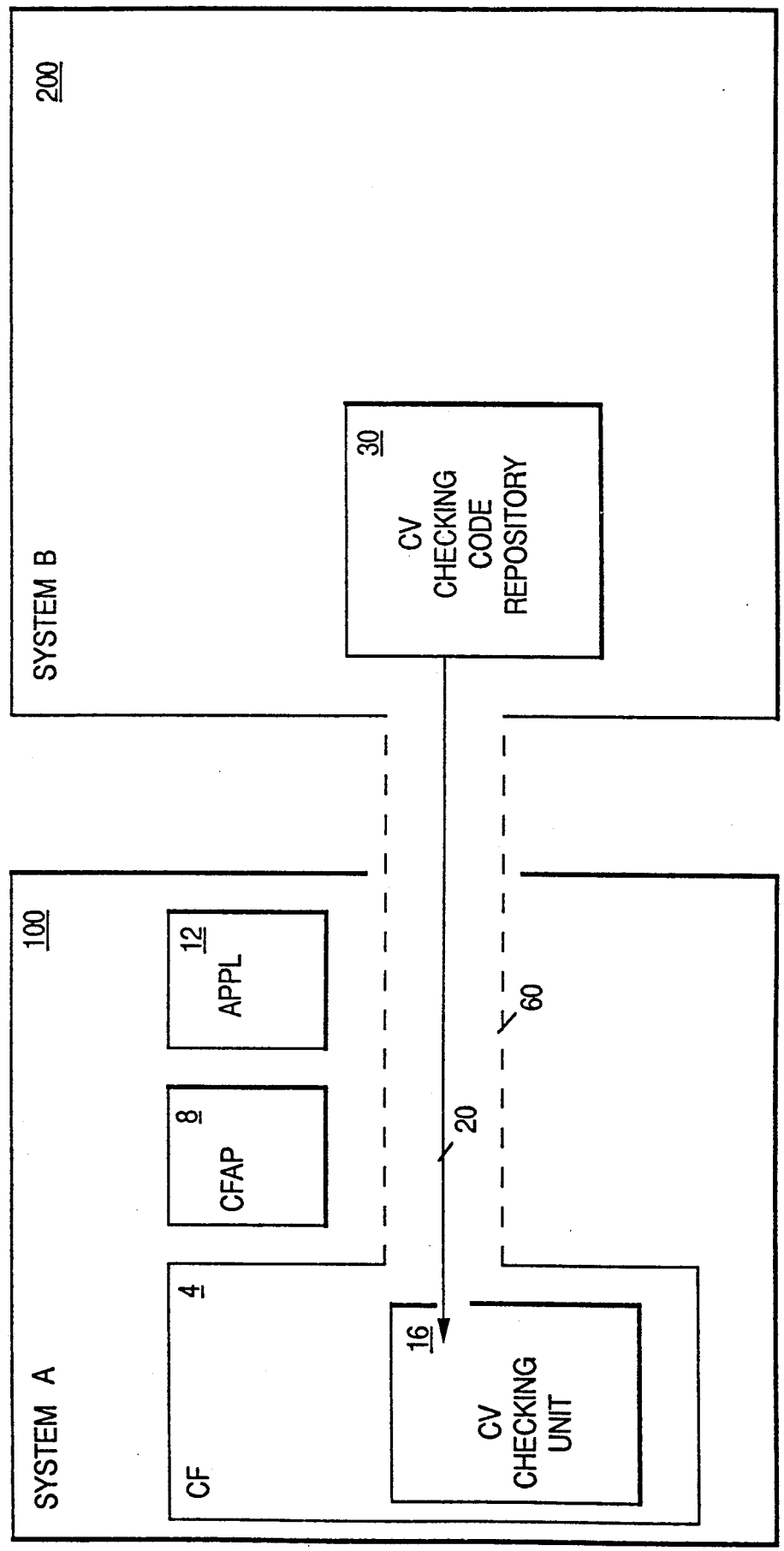
FIG. 1 is a block diagram illustrating the dynamic loading via a secure channel without authentication.
Figure 2:
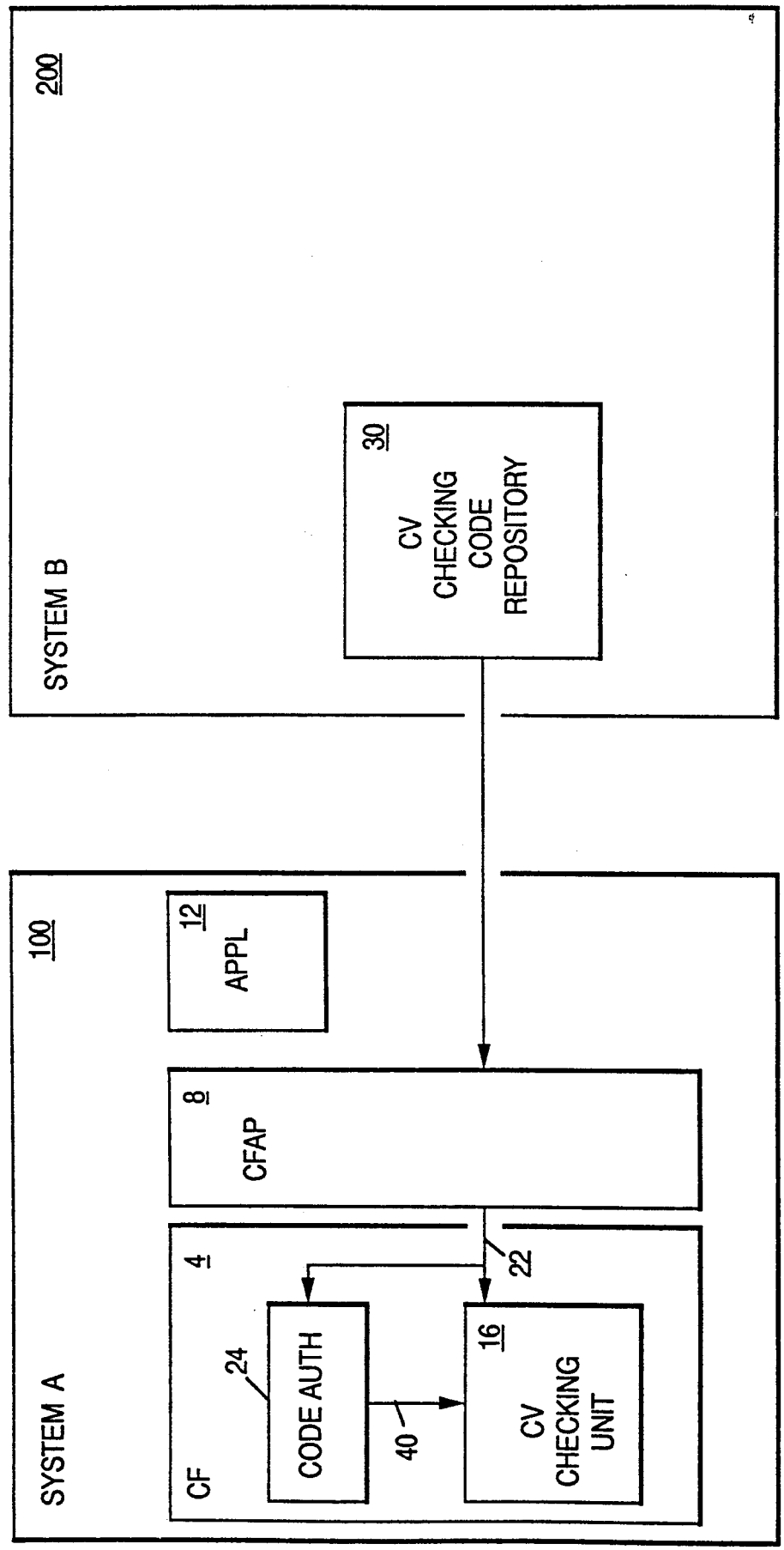
FIG. 2 is a block diagram illustrating the dynamic loading via an insecure channel with authentication.
Figure 3:
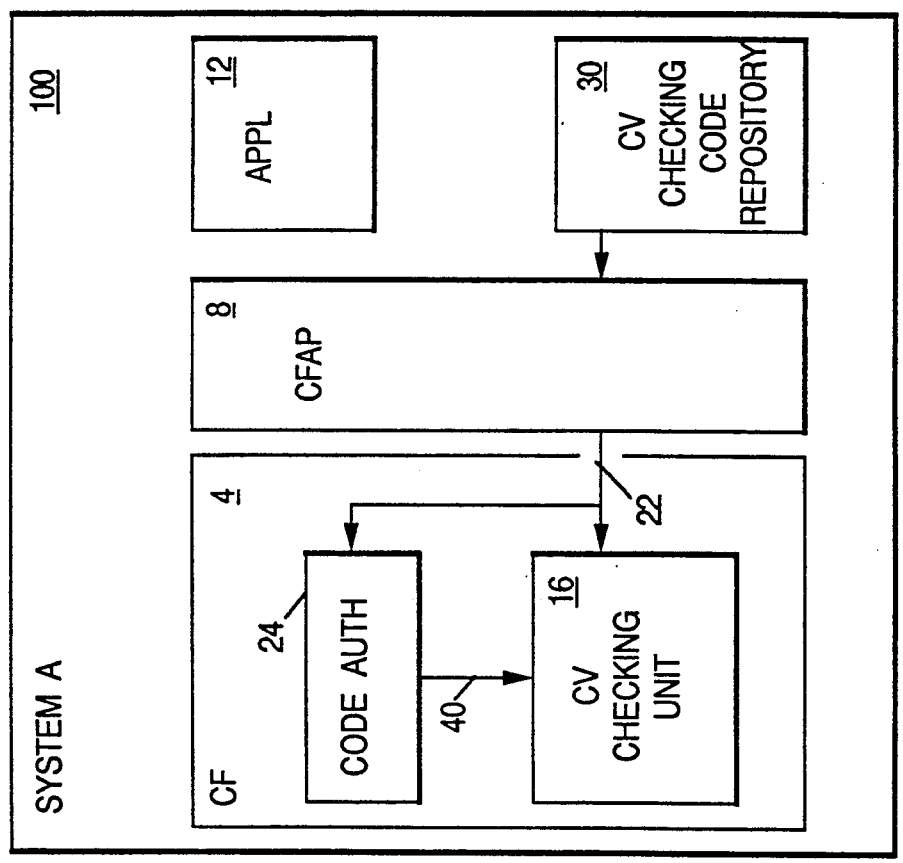
FIG. 3 is a block diagram illustrating the dynamic loading from a local repository with authentication.

FIGS. 1, 2 and 3 show embodiments of the present invention in block diagram form. These configurations include a first cryptographic system or device A 100 and possibly a second system or device B 200. System A 100 contains a cryptographic facility CF 4, a cryptographic facility access program CFAP 8, and a set of application programs APPL 12. The programs APPL 12 request cryptographic services from the CF 4 via the CFAP 8. The CF 4 accepts or rejects these requests based on the validity of the input parameters with respect to a requested operation. In particular, the control vector (CV) checking unit 16 in the CF 4 tests the input control vectors for validity. The CV checking unit 16 executes a sequence of rules or instructions called CV checking code to perform these validity tests. The present invention describes a means to dynamically, securely, and flexibly define, modify, or enhance the CV checking code used by the CV checking unit 16. (Other details of the cryptographic key management environment are described more fully in the above referenced co-pending patent applications.)

FIG. 1 describes one mode of the present invention in which a control vector checking unit 16 of the CF 4 is initialized with dynamically loaded CV checking code via an input channel 20 from a control vector checking code repository 30 in system B 200. The integrity of the CV checking code in input channel 20 is protected by a secure channel 60 which directly links the repository 30 to the physically secure CF 4 in system A 100. The secure channel may consist of a physically secure electrical connection or a logically secure communications session between the CV checking code repository 30 and the CF 4. The system configuration of FIG. 1 is distinguished by the use of a secure channel to protect the integrity of the dynamically loaded CV checking code as opposed to the use of cryptographic authentication techniques.

FIG. 2 is a modification of the configuration of FIG. 1 wherein the integrity of the dynamically loaded CV checking code is protected by cryptographic authentication techniques. In FIG. 2 system B 200 transmits a segment of CV checking code from the CV checking code repository 30 to the CFAP 8 in system A 100. CFAP 8 in turn routes the downloaded CV checking code via an input channel 22 to the code authenticator 24 and the CV checking unit 16 in the CF 4. The code authenticator 24 accepts the downloaded segment of CV checking code as input, performs a cryptographic authentication process on the input data, and outputs a corresponding load authorization signal 40 to the CV checking unit 16. The load authorization signal 40 indicates whether or not the downloaded code has been received with integrity. The CV checking unit 16 accepts and processes the downloaded segment of CV checking code from input channel 22 if and only if the load authorization signal 40 received from the code authenticator 24 indicates that the downloaded code has been authenticated successfully.

The cryptographic authentication process may be based on message authentication codes (MACs) or on modification detection codes (MDCs). In the former approach, it is assumed that system A 100 and system B 200 each have a cryptographic facility, and share a secret authentication key, KDA. System B 200 computes a MAC value which is a function of KDA and the segment of CV checking code to be downloaded. (A method to compute a MAC on arbitrary length text using a cryptographic key is described in detail in the above-referenced co-pending patent applications) System B 200 then transmits the CV checking code and the computed MAC to system A 100. The code authenticator 24 in the CF 4 of system A 100 computes a trial MAC based on the received CV checking code and KDA, compares the MAC value received from system B 200 with the trial MAC, and if equal generates a load authorization signal 40. Otherwise, the trial and received MACs do not match, and no load authorization signal 40 is output. The reader will appreciate that for highest integrity, access to KDA should be limited to trusted elements within each of the communicating systems (e.g., KDA might be stored internally within the CF of each system).

In the MDC approach, it is assumed that a set of reference MDC values corresponding to each of the downloadable segments of CV checking code has been pre-computed and transmitted to system A 100 via a separate, high-integrity channel. (Methods to compute MDCs on arbitrary length text are described in detail in the above-referenced co-pending patent applications.) The MDC values are indexed and stored within the CF 4 of system A 100, and are accessible to the code authenticator 24. System B 200 then transmits a segment of CV checking code to system A 100. The code authenticator 24 in the CF 4 of system A 100 computes a trial MDC value based on the received segment of CV checking code, compares the trial MDC with the pre-stored reference MDC corresponding to the received code segment, and if equal generates a load authorization signal 40. Otherwise, the trial and reference MDCs do not match, and no load authorization signal 40 is output.

FIG. 3 is a modification of the configuration of FIG. 2 wherein the CV checking code repository 30 is physically located within system A 100. This configuration may be used when it is necessary or advantageous to store the CV checking code outside the CF 4 but directly accessible to the CFAP 8. For example, the CV checking code used by the CV checking unit 16 may be physically too large to be stored within the CF 4. In this case, only those segments of the overall CV checking code which are actually needed to validate a requested operation can be dynamically loaded from a local CV checking code repository 30 through CFAP 8 to the CV checking unit 16. As described in FIG. 2, the dynamically loaded CV checking code segment will not be accepted by the CV checking unit 16 unless an authorization signal 40 is received from the code authenticator 24. Likewise, the code authenticator 24 may employ either of the authentication methods described above in order to determine the authenticity of the loaded CV checking code segments.

Figure 4:
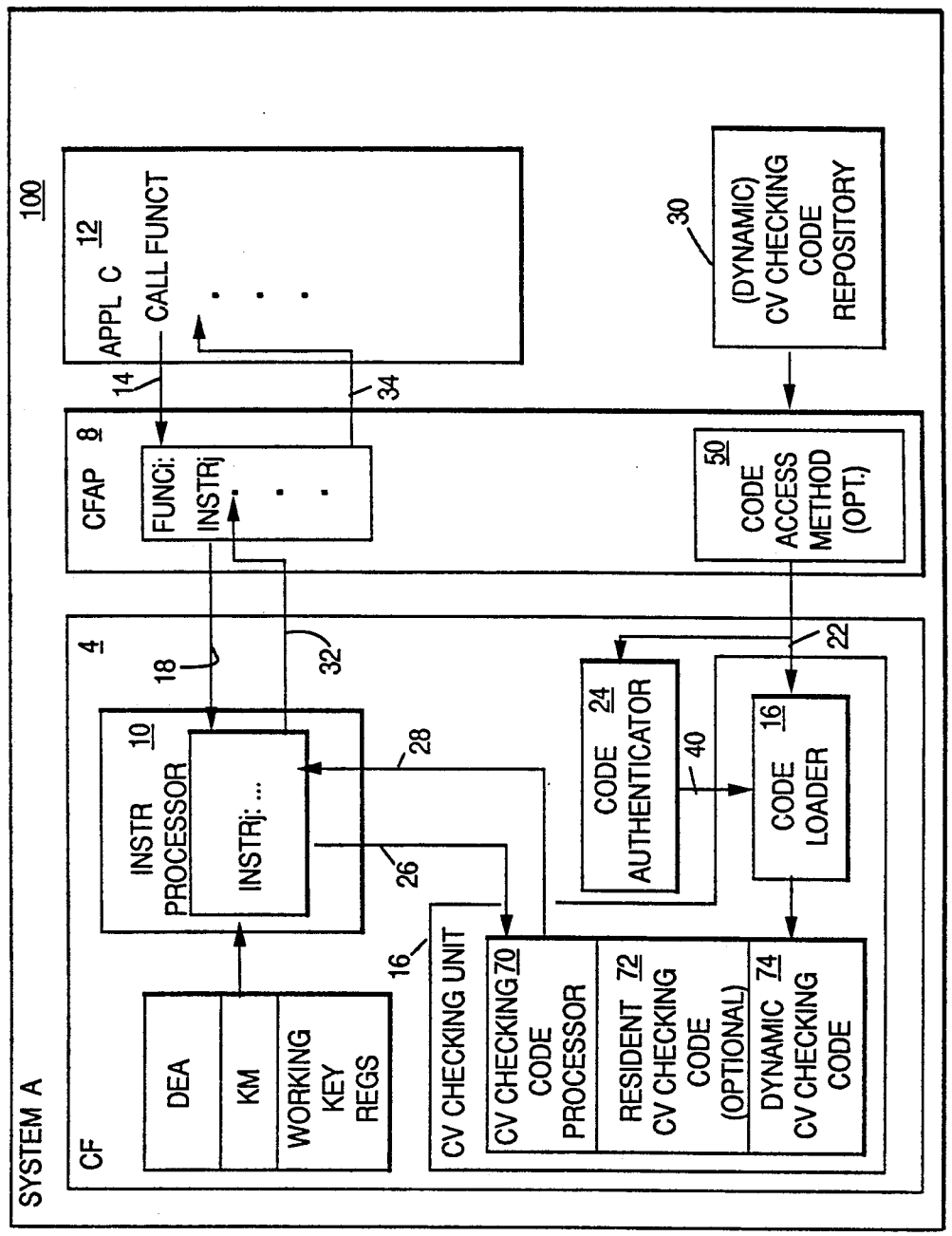
FIG. 4 is a block diagram illustrating a single system as shown in FIG. 3, within which a local control vector checking code repository is located.

FIG. 4 provides a further elaboration of the processing described in FIG. 3, in which the CV checking code repository 30 is local to the cryptographic system A 100. The reader will appreciate that FIG. 4 is equally applicable to the configurations described in FIGS. 1 and 2 in which the CV checking code repository 30 is located in a remote system B 200. In FIG. 4, an application program APPL C 12 requests a cryptographic service via a CALL to function FUNCi, passing a set of input parameters on an input channel 14 to CFAP 8.

Function FUNCi in CFAP 8 in turn invokes one or more instructions within the instruction processor 10 of the CF 4. The diagram shows the invocation of one such instruction INSTRj to which FUNCi passes a set of input parameters (such as an operation code, encrypted keys, control vectors, and ciphertext) via an input channel 18. The instruction processor 10 passes the operation code which corresponds to instruction INSTRj and the set of input control vectors on an input channel 26 to the CV checking unit 16 for validation. If the CV checking unit 16 successfully validates the input control vectors with respect to the operation code associated with INSTRj, then the CV checking unit 16 transmits a positive execution authorization signal 28 back to the instruction processor 10. The instruction processor 10 then completes execution of the instruction INSTRj and returns a set of output parameters to FUNCi via an output channel 32. FUNCi, in turn, may invoke additional instructions or return the output parameters to the calling application APPL C 12 via an output channel 34. However, if the CV checking unit 16 fails to validate the input control vectors, then the CV checking unit 16 returns a negative execute authorization signal 28 to the instruction processor 10. The instruction processor 10 aborts processing of instruction INSTRj and transmits the error condition back to function FUNCi via the output channel 32. FUNCi may then return a corresponding error value to the calling application APPL C 12 via output channel 34.

The present invention describes a flexible, but secure method for implementing a programmable control vector checking unit 16. An elaboration of the components and methods of the control vector checking unit 16 is provided in the following paragraphs.

A CV checking code processor 70 within the CV checking unit 16 accepts the input operation code and control vectors from the instruction processor 10 and executes a sequence of checking rules or instructions known as CV checking code. The CV checking code may be broken up into two parts: an optional fixed part (possibly stored in read only memory) called the resident CV checking code 72, and a variable part (possibly implemented in read-write memory) called the dynamic CV checking code 74. The dynamic CV checking code 74 is retrieved from an external CV checking code repository 30 via an optional code access method function 50 within the CFAP 8. The code access method 50 ensures that the CV checking code required to perform each requested cryptographic function is available when needed by the CV checking unit 16. The code access method 50 may access the CV checking code repository 30 at system startup, on a function-by-function basis, or as requested by the CF 4. The accessed CV checking code segments (and MACs or other authentication parameters) are passed by the code access method 50 to the code loader 76 and to the code authenticator 24 within the CV checking unit 16 via an input channel 22. The code loader stores the code segments into the dynamic CV checking code 74 buffer if and only if a load authorization signal 40 is received from the code authenticator 24. Once the required dynamic CV checking code 74 is loaded, the CV checking code processor 70 begins fetching and executing instructions from the resident CV checking code 72 buffer and from the dynamic CV checking code 74 buffer.

Figure 5:
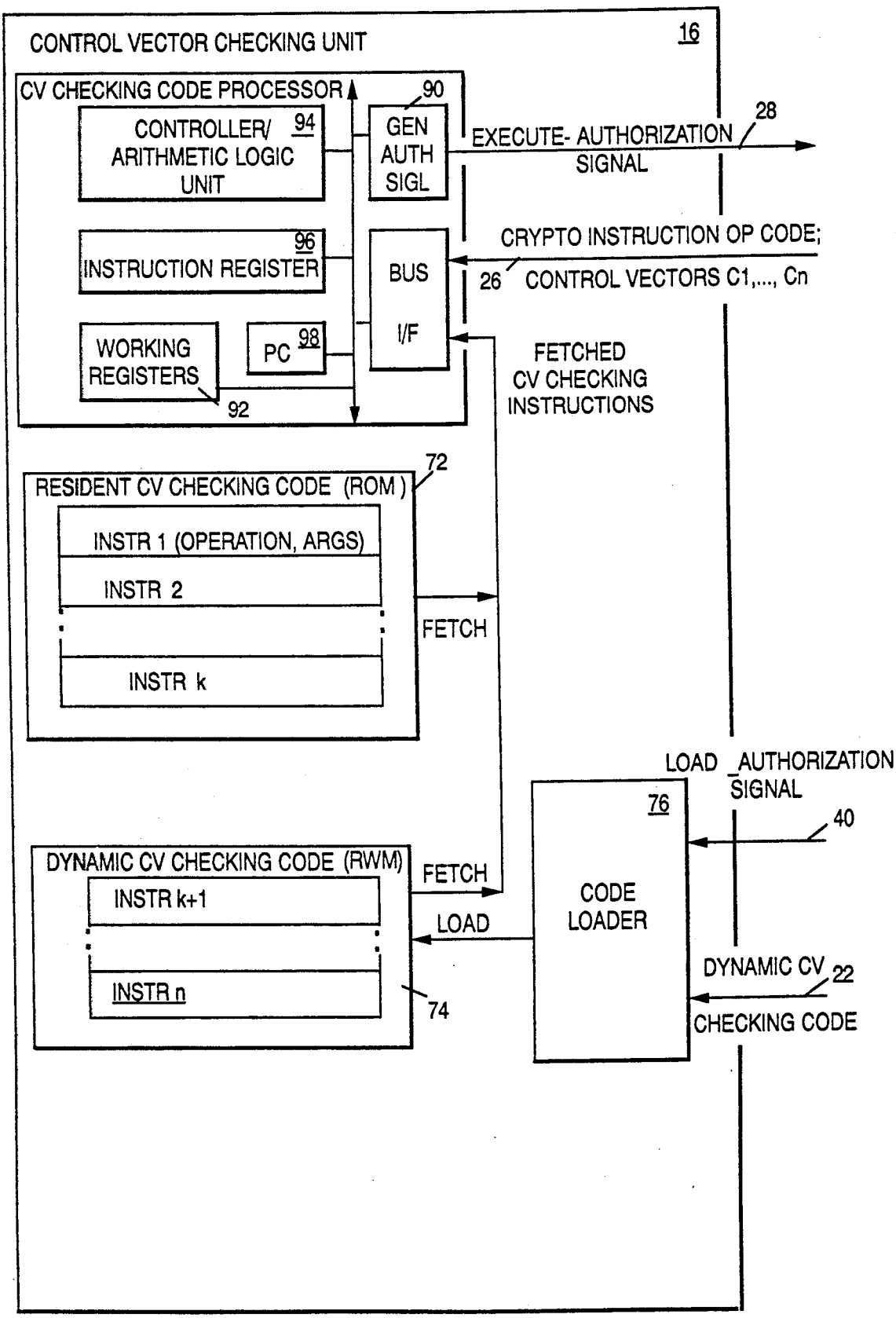
FIG. 5 is a block diagram of the control vector checking unit, in accordance with the invention.

FIG. 5 describes the components and data flow within the CV checking unit 16. As described in FIG. 4, the code loader 76 component accepts a load authorization signal 40 and a segment of code via input channel 22 and stores the code segment in the dynamic CV checking code 74 buffer. The CV checking code processor 70 accepts a cryptographic instruction operation code (opcode) and a set of control vectors C1, ..., Cn and stores the values as required in a set of internal working registers 92. The CV checking code processor 70 contains a controller/arithmetic logic unit 94 which sequences the operation of the processor and provides primitive arithmetic, logical, and relational functions used to test and compare fields of the input control vectors C1, ..., Cn. An instruction register 96 is used to store each CV checking instruction to be executed. A program counter (PC) 98 stores the address of the next instruction to be fetched from the resident and dynamic CV checking code buffers 72 and 74, respectively. A generate authorization signal 90 component outputs the positive or negative execute authorization signal 28 based on the results of CV checking code execution. The reader will appreciate that the CV checking code processor may include other components and storage facilities as needed to support execution or interpretation of the CV checking code. The CV checking code itself may consist of a set of machine-level instructions, each containing an operation code and some arguments, a set of high-level language commands to be interpreted, or simply a set of parameters used to control the checking and cross-checking of fields within the input control vectors C1, ..., Cn. The resident CV checking code 72 may represent a fixed sequence of checking rules which is common to all cryptographic functions, or it may represent the CV checking rules associated with a first CV architecture. The dynamic CV checking code 74 may contain function-specific CV checking rules, or it may represent extensions corresponding to a second CV architecture.

Figure 6:
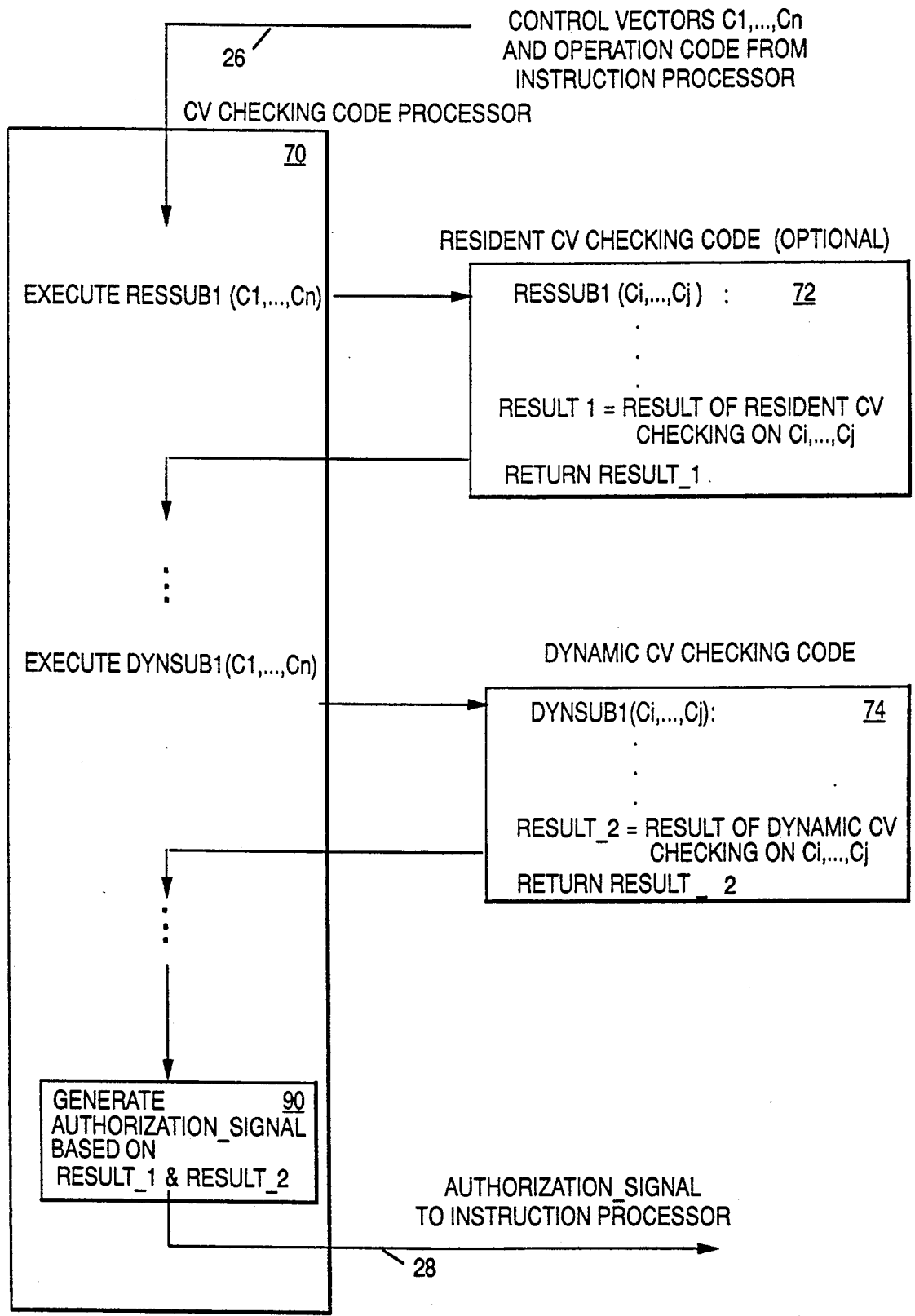
FIG. 6 is an organizational diagram illustrating the direct linkage to dynamic control vector checking code.

FIG. 6 illustrates one method of control flow linkage between the optional resident CV checking code 72 and the dynamic CV checking code 74. In this method, the resident CV checking code 72, if present, is executed first to test the input control vectors C1, ..., Cn against the fixed CV rules. The resident code returns a first validity result RESULT_1 on the basis of its test results. RESULT_1 may be in the form of an error code or a simple valid/not-valid flag. The CV checking code processor 70 then executes the dynamic CV checking code 74, if loaded (a system flag may be interrogated to determine the state of the dynamic CV checking code 74 buffer), to test the input control vectors C1, ..., Cn against a second, variable set of CV rules. The dynamic 74 code returns a second validity result RESULT_2 on the basis of its test results. The generate authorization signal 90 component of the CV checking code processor 70 combines the results of resident and dynamic CV checking, RESULT_1 and RESULT_2, to generate a positive or negative execute authorization signal 28 for the instruction processor 10. A feature of this method is the independence of the resident and dynamic CV checking codes 72 and 74: the control flow linkage and result correlation is performed by the CV checking code processor 70 in the generate authorization signal component 90.

Figure 7:
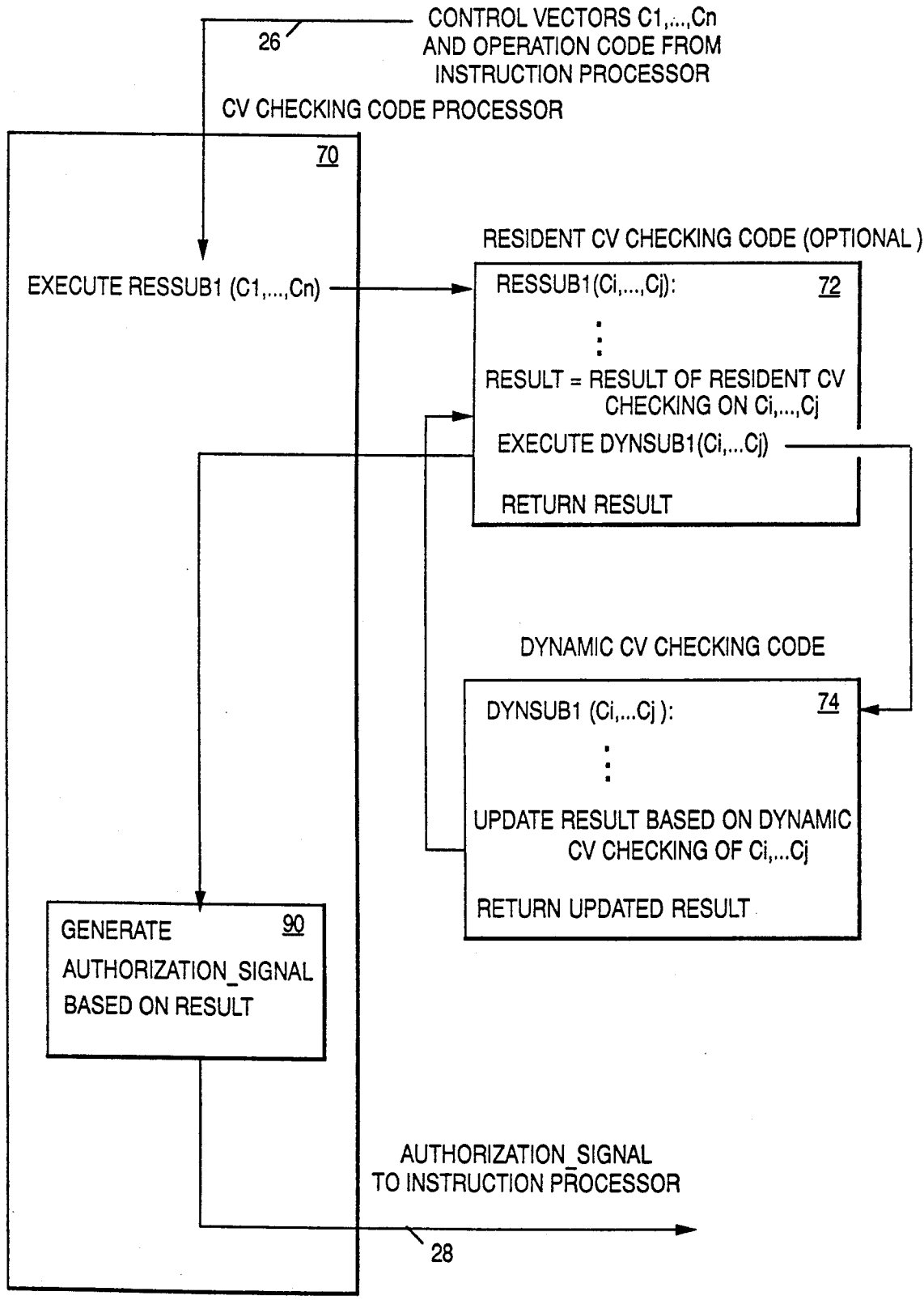
FIG. 7 is an organizational illustration showing the indirect linkage to dynamic control vector checking code.

FIG. 7 illustrates a second, indirect method of control flow linkage between the optional resident CV checking code 72 and the dynamic CV checking code 74. In contrast to the above method, the resident CV checking code 72 transfers control to the dynamic CV checking code 74 via a programmed exit. The dynamic CV checking code 74 performs additional checking on the input CVs and modifies the RESULT obtained from the resident CV checking code 72. The updated RESULT and program control is then returned to the resident CV checking code 72, which, in turn, passes it back to the CV checking code processor. This method is distinguished by the fact that the dynamic CV checking code 74 can adjust the results of the fixed resident CV checking code 72 on the basis of enhanced or extended CV checking rules present in the dynamic CV checking code 74. However, this method requires that the implementer plan for such enhancements or extensions by including a programmed control exit in the fixed resident CV checking code 72.

Figure 8:
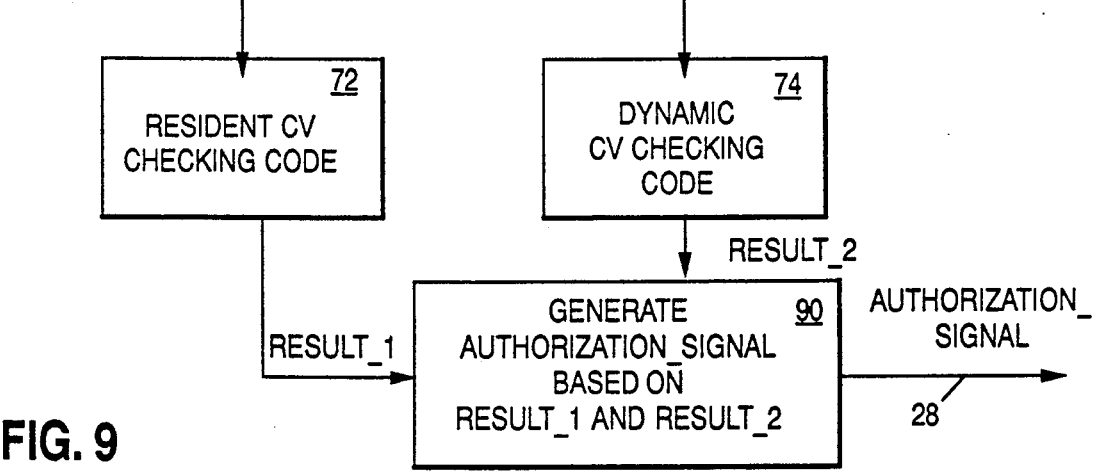
FIG. 8 is a data flow diagram illustrating having control vectors with a first portion of being checked by control vector checking code which is permanently resident within the control vector checking unit and a second portion of the control vector which is subject to control vector checking using dynamic code which is input from the control vector checking code repository.

FIG. 8 illustrates how the resident CV checking code 72 may be used to validate certain fields in a first control vector part and the dynamic CV checking code 74 may be used to validate fields in a second control vector part of an input control vector Ci. The first CV part may be associated with a first CV architecture whereas the second CV part may be associated with a second CV architecture. Such a second architecture may arise from enhancements or extensions made to the first architecture by the vendor or user of the cryptographic system.

Figure 9:
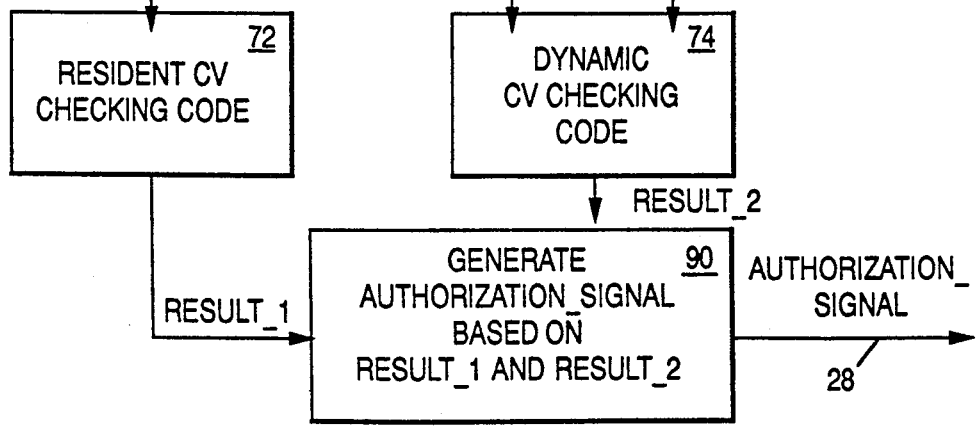
FIG. 9 is a data flow diagram which illustrates the ability to have the dynamic control vector checking code shown in FIG. 7, also cross-check a portion of the control vector which is checked with the resident control vector checking code.

FIG. 9 illustrates a further extension of this notion in which the resident CV checking code 72 may be used to validate certain fields in a first control vector part, the dynamic CV checking code 74 may be used to validate fields in a second control vector part, and the dynamic CV checking code 74 may also perform CV cross-checking on the first and second control vector parts. Cross-checking is a method of validating one or more control vectors or control vector fields on the basis of the contents of other control vectors or control vector fields. The rules for cross-checking may include testing fields from the first CV parts for consistency with fields from the second CV parts.

Figure 10:
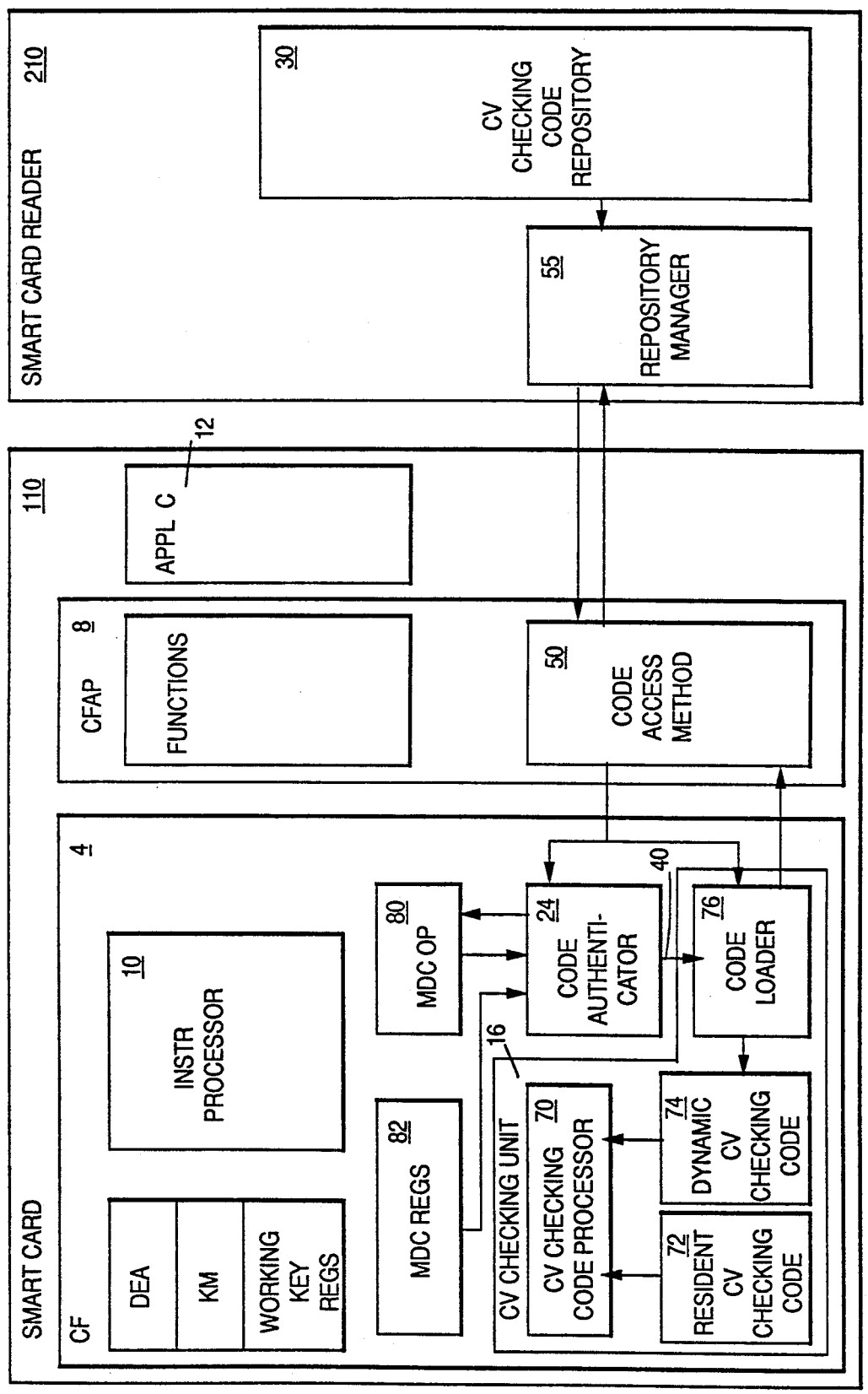
FIG. 10 illustrates a smart card reader which provides bulk storage for a smart card control vector checking code, in accordance with the invention.

An application of the invention is to provide bulk storage for the control vector checking code required for operation of a smart card, as illustrated in the system block diagram in FIG. 10. A smart card is a cryptographic device in the form of a common consumer credit card. The card is used to authenticate the consumer to other cryptographic devices, such as terminals, automatic teller machines, etc. The smart card reader is a cryptographic device or system which accepts and validates an inserted smart card, and provides an electrical interface between the smart card and some system application. Because of its size, a smart card may have limited memory for the storage of its CV checking code. However, by applying this invention the CV checking code may be stored within the smart card reader and securely transferred (in parts, as needed) to the smart card.

In FIG. 10, the CV checking code loader 76 in the CV checking unit 16 of the CF 4 of the smart card 110 requests a new segment of code from the code access method 50 in CFAP 8. The code access method 50 transmits a corresponding request to the repository manager 55 in the smart card reader 210. The repository manager 55 accesses the CV checking code repository 30 (which may be a bulk data storage device such as a local or host-attached hard disk), extracts the requested CV checking code, and transmits the code back to the code access method 50 in the smart card 110. The code access method 50 passes the dynamic CV checking code to the code authenticator 24 which uses the MDC operation 80 to compute a modification detection code on the received code. The code authenticator 24 also retrieves a pre-loaded reference MDC value from a set of MDC registers 82. The MDC registers 82 may contain one trial MDC corresponding to each loadable CV checking code segment. The MDC registers were pre-loaded via a physically or logically secure channel by authorized system personnel. The code authenticator 24 compares the computed trial MDC with the reference MDC for equality. If the trial MDC matches the reference MDC, an enabling load authorization signal 40 is passed to the code loader 76 to load the dynamic CV checking code segment into the dynamic CV checking code 74 buffer. Otherwise, the code segment is discarded and an authentication error is reported. If loaded successfully, the dynamic CV checking code 74 may then be used by the CV checking code processor 70 as described in prior figures.

Although specific embodiments of the invention have been disclosed, it will be understood by those having skill in the art that changes can be made to the specific embodiments, without departing from the spirit and the scope of the invention.

What is claimed is:

1. In a data processing system which includes a control vector based cryptographic facility, a method for providing control vector checking code to be executed in the cryptographic facility, comprising the steps of:
   storing control vector checking code in a control vector checking code repository which is coupled to said cryptographic facility;
   transmitting a portion of said control vector checking code to said cryptographic facility, from said repository;
   executing said control vector checking code in said cryptographic facility.

2. The method of claim 1 which further comprises:

inputting a first modification detection code to said cryptographic facility, characterizing said portion of said control vector checking code;
computing a second modification detection code on said portion of said control vector checking code received from said repository;
comparing said first modification detection code to said second modification detection code;
authenticating said portion of said control vector checking code received at said cryptographic facility if said first modification detection code compares with said second modification detection code.

3. The method of claim 1 wherein said portion of said control vector checking code is transmitted over a physically secure link from said repository to said cryptographic facility.

4. The method of claim 1 which further comprises:
inputting a first message authentication code to said cryptographic facility, characterizing said portion of said control vector checking code;
computing a second message authentication code on said portion of said control vector checking code received from said repository;
comparing said first message authentication code to said second message authentication code;
authenticating said portion of said control vector checking code received at said cryptographic facility if said first message authentication code compares with said second message authentication code.

5. In a data processing system which includes a control vector based cryptographic facility, a method for augmenting control vector checking code to be executed in the cryptographic facility, comprising the steps of:
storing resident control vector checking code in a resident storage in a cryptographic facility;
storing dynamic control vector checking code in a control vector checking code repository which is coupled to said cryptographic facility;
transmitting a portion of said dynamic control vector checking code from said repository to said cryptographic facility;
storing said portion of said dynamic control vector checking code in a dynamic code buffer in said cryptographic facility;
executing said resident control vector checking code and said dynamic control vector checking code in said cryptographic facility.

6. The method of claim 5, which further comprises:
inputting a first modification detection code to said cryptographic facility, characterizing said portion of said dynamic control vector checking code;
computing a second modification detection code on said portion of said dynamic control vector checking code received from said repository;
comparing said first modification detection code to said second modification detection code;
authenticating said portion of said dynamic control vector checking code received at said cryptographic facility if said first modification detection code compares with said second modification detection code.

7. The method of claim 6, which further comprises:
said resident control vector checking code completing execution prior to the execution of said dynamic control vector checking code.

8. The method of claim 6, which further comprises:
said resident control vector checking code calling portions of said dynamic control vector checking code for execution, during the execution of said resident control vector checking code.

9. The method of claim 6, which further comprises:
said resident control vector checking code checking a first portion of a control vector and said dynamic control vector checking code checking a second portion of said control vector.

10. The method of claim 6, which further comprises:
said resident control vector checking code checking a first portion of a control vector and said dynamic control vector checking code checking said first portion of said control vector and further checking a second portion of said control vector.

11. The method of claim 6, which further comprises:
said cryptographic facility residing on a smart card and said control vector checking code repository residing in a smart card reader which is operatively coupled to said smart card.

12. In a data processing system which includes a control vector based cryptographic facility, an apparatus for providing control vector checking code to be executed in the cryptographic facility, comprising:
a control vector checking code processor in said cryptographic facility, for executing control vector checking code to check control vectors;
a resident control vector checking code buffer in said cryptographic facility for storing resident control vector checking code to be executed by said control vector checking code processor;
a control vector checking code repository coupled to said cryptographic facility, for storing dynamic control vector checking code;
a dynamic control vector checking code buffer in said cryptographic facility, for receiving a portion of said dynamic control vector checking code transmitted from said repository;
said control vector checking code processor, executing said resident control vector checking code to perform a first checking operation on said control vector, and executing said dynamic control vector checking code to perform an augmented control vector checking operation on said control vector.

13. The apparatus of claim 12, which further comprises:
a code authenticator in said cryptographic facility, for receiving a first value of a modification detection code characterizing said portion of said dynamic control vector checking code and for computing a second value of a modification detection code from said portion of said dynamic control vector checking code;
said code authenticator having an output coupled to said dynamic control vector checking code buffer, for enabling the transmission of said dynamic control vector checking code from said repository to said dynamic control vector checking code buffer when said first value of said modification detection code compares with said second value.

14. The apparatus of claim 13, which further comprises:
said cryptographic facility residing on a smart card and said control vector checking code repository residing in a smart card reader operatively coupled to said smart card.

15. The apparatus of claim 12, which further comprises:
- a code authenticator in said cryptographic facility, for receiving a first value of a message authentication code characterizing said portion of said dynamic control vector checking code and for computing a second value of a message authentication code from said portion of said dynamic control vector checking code;
- said code authenticator having an output coupled to said dynamic control vector checking code buffer, for enabling the transmission of said dynamic control vector checking code from said repository to said dynamic control vector checking code buffer when said first value of said message authentication code compares with said second value.

16. The apparatus of claim 15, which further comprises:
- said cryptographic facility residing on a smart card and said control vector checking code repository residing in a smart card reader operatively coupled to said smart card.

* * * * *